(12) United States Patent
Lu et al.

(10) Patent No.: US 9,314,727 B2
(45) Date of Patent: *Apr. 19, 2016

(54) CORDIERITE FORMING BATCH COMPOSITIONS AND CORDIERITE BODIES MANUFACTURED THEREFROM

(75) Inventors: Yanxia Lu, Painted Post, NY (US); Jianguo Wang, Horseheads, NY (US); Yuming Xie, Sugar Land, TX (US)

(73) Assignee: Corning Incorporated, Coning, NY (US)

( * ) Notice: Subject to any disclaimer, the term of this patent is extended or adjusted under 35 U.S.C. 154(b) by 446 days.

This patent is subject to a terminal disclaimer.

(21) Appl. No.: 12/423,317

(22) Filed: Apr. 14, 2009

(65) Prior Publication Data

US 2010/0129600 A1 May 27, 2010

Related U.S. Application Data

(60) Provisional application No. 61/118,176, filed on Nov. 26, 2008.

(51) Int. Cl.
| | |
|---|---|
| *C04B 35/195* | (2006.01) |
| *B32B 3/12* | (2006.01) |
| *B01D 46/24* | (2006.01) |
| *B01D 46/00* | (2006.01) |
| *C04B 38/00* | (2006.01) |
| *C04B 111/00* | (2006.01) |

(52) U.S. Cl.
CPC ........ *B01D 46/2429* (2013.01); *B01D 46/0001* (2013.01); *C04B 35/195* (2013.01); *C04B 38/0006* (2013.01); *B01D 46/244* (2013.01); *B01D 46/2425* (2013.01); *B01D 46/2444* (2013.01); *B01D 46/2448* (2013.01); *B01D 46/2455* (2013.01); *B01D 46/2466* (2013.01); *B01D 2046/2433* (2013.01); *B01D 2046/2437* (2013.01); *B01D 2279/30* (2013.01); *C04B 2111/00793* (2013.01); *Y10T 428/24149* (2015.01)

(58) Field of Classification Search
CPC ...................................... C04B 35/195
USPC ............................... 428/116, 304.4
See application file for complete search history.

(56) References Cited

U.S. PATENT DOCUMENTS

| | | | | |
|---|---|---|---|---|
| 6,214,437 | B1 | 4/2001 | Beall et al. | 428/116 |
| 2004/0029707 | A1* | 2/2004 | Beall et al. | 501/119 |
| 2004/0261384 | A1 | 12/2004 | Merkel et al. | 55/523 |
| 2007/0141301 | A1 | 6/2007 | Boorom et al. | 428/116 |
| 2008/0004171 | A1* | 1/2008 | Melscoet-Chauvel et al. | 501/119 |
| 2008/0032090 | A1* | 2/2008 | Beall et al. | 428/116 |
| 2008/0032091 | A1* | 2/2008 | Beall et al. | 428/116 |

(Continued)

FOREIGN PATENT DOCUMENTS

| | | |
|---|---|---|
| JP | 2002191985 | 7/2002 |
| WO | WO2005/005794 | 1/2005 |

(Continued)

*Primary Examiner* — Humera Sheikh
*Assistant Examiner* — Lucas Wang
(74) *Attorney, Agent, or Firm* — John L. Haack

(57) ABSTRACT

Disclosed are cordierite bodies having relatively high porosity and controlled pore size. The porous cordierite bodies generally include a primary cordierite ceramic phase as defined herein. Also disclosed are methods for making and using the cordierite bodies.

6 Claims, 9 Drawing Sheets

(56) References Cited

U.S. PATENT DOCUMENTS

2009/0087613 A1* 4/2009 Lu et al. .................. 428/117
2009/0297764 A1* 12/2009 Beall et al. ................ 428/116

FOREIGN PATENT DOCUMENTS

WO WO 2007/064454 6/2007
WO WO2007/075333 7/2007

* cited by examiner

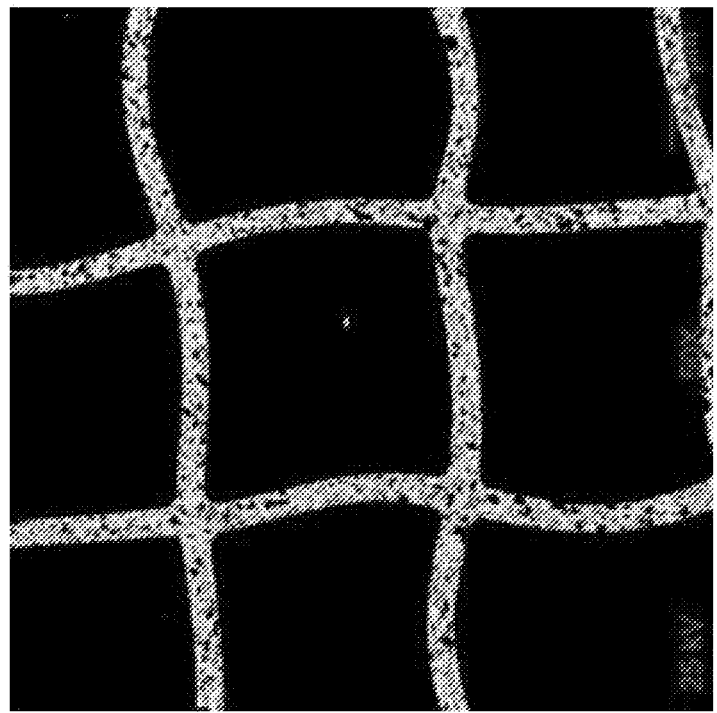
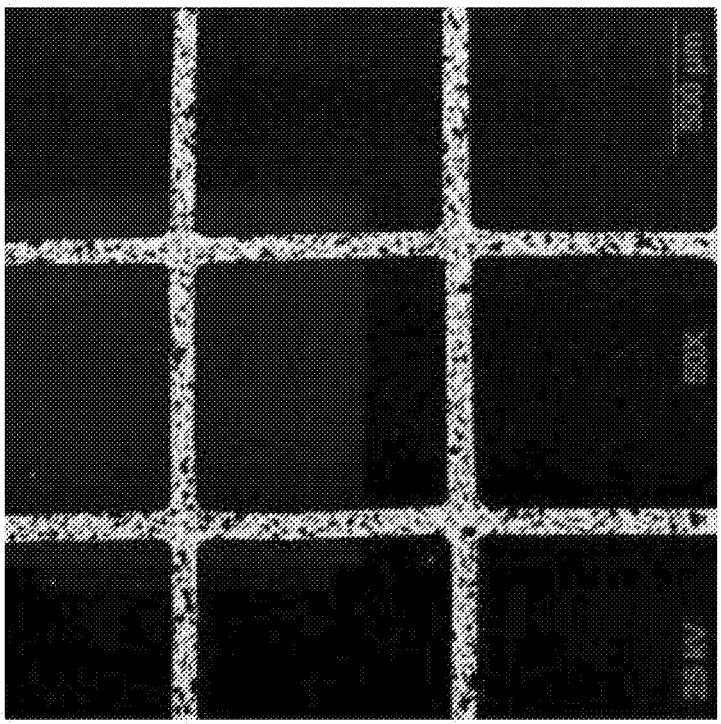
FIG. 8

CORDIERITE FORMING BATCH COMPOSITIONS AND CORDIERITE BODIES MANUFACTURED THEREFROM

CROSS REFERENCE TO RELATED APPLICATIONS

This application claims the benefit of priority under 35 U.S.C. §120 to U.S. Provisional Patent Application Ser. No. 61/118,176, filed Nov. 26, 2008, the content of which is relied upon and incorporated herein by reference in its entirety.

BACKGROUND

The disclosure relates to porous cordierite bodies and methods and compositions for the manufacture thereof. More particularly, the disclosure relates to porous cordierite ceramics useful in catalytic converters and particulate filters, such as for engine exhaust after-treatment.

SUMMARY

The disclosure provides cordierite bodies having a relatively high total porosity, a controlled median pore size, and improved strength that make them excellent choices for catalytic converter substrates or particulate filters such as diesel particulate filters (DPFs). The disclosure further provides batch compositions useful both for the production of catalytic converter substrates and diesel particulate filters.

In embodiments, the porous cordierite ceramic honeycomb bodies exhibit a total porosity (% P) of at least 25%, such as, for example, from about 25% to about 56%, 25% to 40%, 30% to 55%, or from about 40% to about 56%. In embodiments, the porous cordierite ceramic bodies can have a median pore size $d_{50}$ of from about 2 microns to about 10 microns, and a modulus of rupture strength (MOR) of at least 220 pounds per square inch (1.52 MPa) for cordierite bodies with 600 cells per square inch and 3 mil (about 75 microns) thick webs, such as, for example, greater than about 300 pounds per square inch (2.07 MPa).

Among several advantages provided by various embodiments, the porous honeycomb bodies exhibit relatively higher strengths for a given porosity, pore size, pore size distribution and thermal mass than those of traditional cordierite ceramics, making them desirable for use in applications that desire high strength and high porosity substrates. The disclosed compositions also provide flexible pore structure design, which can be achieved by the introduction of a pore former into the batch compositions disclosed and described herein.

In accordance with a further embodiment of the disclosure, a batch composition is provided for forming a porous ceramic honeycomb body. The batch composition generally comprises a cordierite forming inorganic batch mixture comprising a magnesium oxide source; a silica source; and an aluminum source. The batch composition further comprises an optional pore forming agent, an inorganic binder, an organic binder, and a liquid vehicle.

Still further, in other embodiments of the disclosure, methods are provided for forming porous cordierite ceramic honeycomb bodies disclosed herein. The method generally comprise mixing inorganic raw materials, an organic binder, and a liquid vehicle to form a plasticized batch, forming a green body from the plasticized batch, drying the green body, and firing the body to provide the cordierite ceramic structure.

Additional embodiments of the disclosure will be set forth, in part, in the detailed description, and any claims which follow, or can be learned by practice of the disclosure. The foregoing general description and the following detailed description are exemplary and explanatory only and are not restrictive.

BRIEF DESCRIPTION OF THE DRAWINGS

The accompanying drawings illustrate certain embodiments of the disclosure.

FIG. 5B is an SEM image of the surface of a batch composition with 42.5% porosity and 2.5 micron mps.

FIGS. 8A and 8B are SEM images of a honeycomb wherein the Young's modulus $E_{mod}$=2.53 MPa. FIG. 8B is an SEM image of a honeycomb wherein the Young's modulus $E_{mod}$=1.7 MPa.

DETAILED DESCRIPTION

Figure 1:
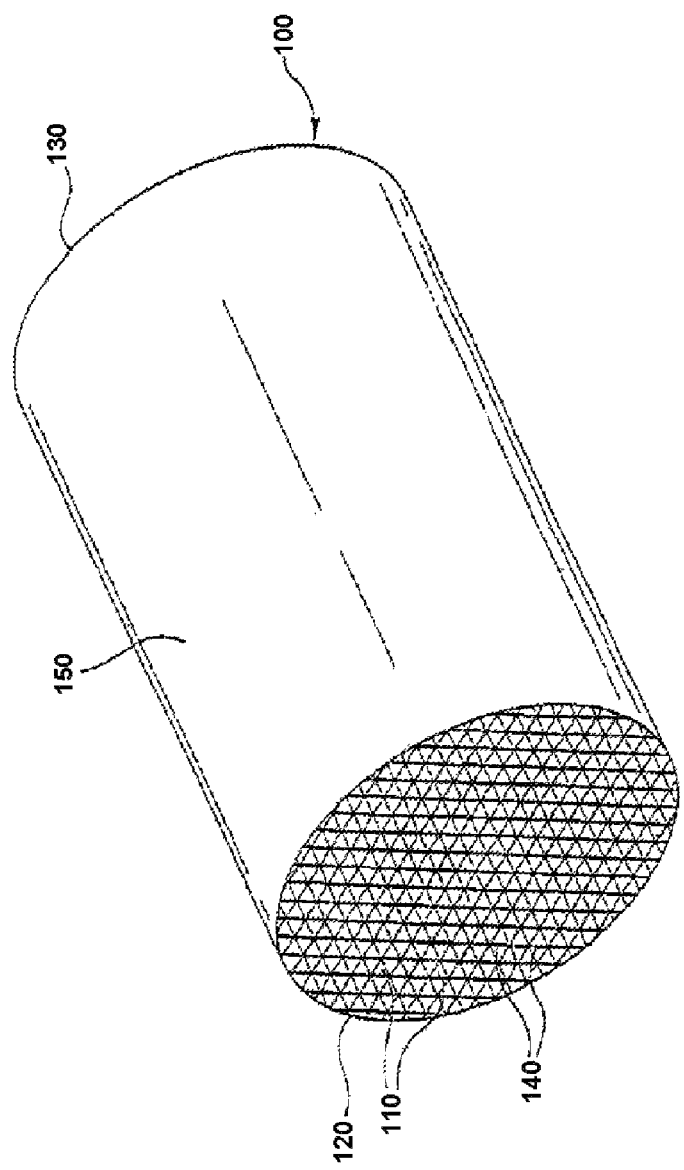
FIG. 1 is an isometric view of a porous honeycomb substrate.

Various embodiments of the disclosure will be described in detail with reference to drawings, if any. Reference to various embodiments does not limit the scope of the disclosure, which is limited only by the scope of the claims attached hereto. Additionally, any examples set forth in this specification are not limiting and merely set forth some of the many possible embodiments for the claimed invention.

Disclosed are materials, compounds, compositions, and components that can be used for, can be used in conjunction with, can be used in preparation for, or are products of the disclosed method and compositions. These and other materials are disclosed herein, and when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including any components of the compositions and steps in methods of making and using the disclosed compositions. Thus, if there are a variety of additional steps that can be performed each of these additional steps can be performed with any specific embodiment or combination of embodiments of the disclosed methods, and that each such combination is specifically contemplated and should be considered disclosed.

As used herein, "include," "includes," or like terms means including but not limited to.

The singular forms "a," "an," and "the" include plural referents unless the context clearly dictates otherwise. Thus, for example, reference to a "component" includes embodiments having two or more such components, unless the context clearly indicates otherwise.

The term "optional" or "optionally" means that the subsequently described event or circumstance can or cannot occur, and that the description includes instances where the event or circumstance occurs and instances where it does not. For example, the phrase "optional component" means that the component can or can not be present and that the disclosure includes both embodiments including and excluding the component.

Ranges can be expressed herein as from "about" one particular value, to "about" another particular value, or "about" both values. When such a range is expressed, another embodiment includes from the one particular value, to another particular value, or both. Similarly, when values are expressed as approximations, by use of the antecedent "about," the particular value forms another embodiment. The endpoints of each of the ranges are significant both in relation to the other endpoint, and independently of the other endpoint.

"Weight percent," "wt. %," "percent by weight" or like terms referring to, for example, a component, unless specifically stated to the contrary, refers to the ratio of the weight of the component to the total weight of the composition in which the component is included, expressed as a percentage.

Porous cordierite ceramic honeycomb structures are useful for pollution control devices such as catalytic converter substrates, SCR substrates, and wall flow particulate filters such as diesel particulate filters (DPFs). Achieving high strength in low-mass cordierite honeycombs remains a challenge because the presence of microcracks, which are beneficial in obtaining a very low coefficient of thermal expansion (CTE), but can significantly reduce the overall strength of the ceramic body.

Another challenge in the manufacture of pollution control devices relates to providing pore structures of cordierite bodies for different applications. For example, relatively coarse powders are generally used to make diesel particulate filters comprised of relatively high porosities and large pore sizes. By contrast, relatively fine powder is generally used to make auto substrates to make thin webs, especially for ultra-thin wall products.

Thus, embodiments of the disclosure provide cordierite bodies having desired levels of porosity, controlled pore size distributions, and desired strength, which may be useful for pollution control devices such as catalytic converter substrates, SCR substrates, and DPF's. Additionally, embodiments of the disclosure also provide batch compositions that are suitable for use in making both particulate filters and catalytic converter substrates from the same batch composition.

In embodiments, the porous ceramic bodies of the disclosure exhibit relatively high levels of total porosity as measured by mercury porosimetry. For example, the ceramic bodies of the disclosure can have a total porosity $P \geq 25\%$ such as a total porosity of at least 25%, at least 30%, and even at least 40%. Additionally or alternatively, the porous ceramic bodies can have a total porosity of from about 25% to about 56%, of from about 25% to about 40%, of from about 30% to about 50%, and even from about 40% to about 56%.

The porosity of the ceramic bodies is comprised of a plurality of pores having controlled median pore size $d_{50}$. The median pore size is the pore size wherein 50% of the pore volume of the porous ceramic body has a smaller pore size and 50% of the pore volume has a larger pore size. In embodiments, the porous ceramic bodies can have a median pore size $d_{50}$ in the range of from about 2 microns to about 10 microns. For example, the ceramic bodies of the disclosure can have a median pore size $d_{50}$ from about 3 microns to about 8 microns, in from about 3 microns to about 7 microns, and of from about 3 microns to about 6 microns.

The modulus of rupture (MOR) strength of a porous ceramic body can be measured by the four-point method on a cellular bar, such as either about 0.5×1.0×5.0 inches (1.27× 2.54×12.7 cm) or about 0.25×0.5×2.75 inches (0.635×1.27× 6.985 cm), whose length is parallel to the channels of the body. The MOR is a measure of the flexural strength of the ceramic body. The modulus of rupture MOR can be the modulus of rupture strength measured at 25° C. A high value of MOR is desired because this corresponds to greater mechanical durability of the body and higher thermal durability and thermal shock resistance. A high value of MOR also yields higher values for the thermal shock parameter, $(MOR_{25°\,C.}/E_{25°\,C.}) (CTE_{500-900°\,C.})^{-1}$ and strain tolerance, $(MOR_{25°\,C.}/E_{25°\,C.})$. In embodiments, the porous ceramic bodies exhibit a modulus of rupture (MOR) strength of at least about 220 pounds per square inch (1.52 MPa). For example, the porous ceramic bodies can have an MOR strength of greater than about 250 pounds per square inch (1.72 MPa), 300 pounds per square inch (2.07 MPa), and even 400 pounds per square inch (2.76 MPa).

The coefficient of thermal expansion, CTE, is measured by dilatometry along the axial direction of the specimen, which is the direction parallel to the lengths of the honeycomb channels. The value of $CTE_{500-900°\,C.}$ is the mean coefficient of thermal expansion from about 500 to about 900° C. Similarly, the value of $CTE_{25-800°\,C.}$ is the mean coefficient of thermal expansion from about 25 to about 800° C., and the value of $CTE_{200-1000°\,C.}$ is the mean coefficient of thermal expansion from about 200 to about 1,000° C., all as measured during heating of the sample. A low value of CTE is desired for high thermal durability and thermal shock resistance. A low value of CTE yields higher values for the thermal shock parameter, $(MOR_{25°\,C.}/E_{25°\,C.})(CTE_{500-900°\,C.})^{-1}$. In embodiments, the porous ceramic bodies exhibit a coefficient of thermal expansion (CTE) in the axial direction less than about $3.0 \times 10^{-7}/°$ C. across the temperature range of from about 25° C. to about 800° C. (i.e., $CTE_{25-800°\,C.}$). For example, the porous ceramic bodies can have a $CTE_{25-800°\,C.}$ value of $\leq 2$, $\leq 1.5$, and even $\leq 1$.

The elastic modulus (Young's modulus), $E_{mod}$, is measured by a sonic resonance technique either along the axial direction of a 0.5×1.0×5.0 inch body (1.27×2.54×12.7 cm) specimen or along the length of a 0.25×5.0 inch (0.635×12.7 cm) cylindrical rod. The elastic modulus is a measure of the rigidity of the body. The value $E_{mod25°\,C.}$ is the elastic modulus of the specimen at or near room temperature before heating of the specimen. $E_{mod900°\,C.}$, is the elastic modulus of the specimen measured at 900° C. during heating of the specimen. In embodiments, the porous ceramic bodies exhibit an elastic modulus $E_{mod25°\,C.}$ greater than about 0.400 Mpsi ($2.76 \times 10^3$ MPa), but less than 1.2 Mpsi ($8.27 \times 10^3$ MPa). For example, the porous ceramic bodies can exhibit an $E_{mod}$ greater than about 0.500 Mpsi ($3.45 \times 10^3$ MPa) and less than about 1 Mpsi ($6.90 \times 10^3$ MPa), including about 0.5 Mpsi ($3.45 \times 10^3$ MPa), 0.6 Mpsi ($4.14 \times 10^3$ MPa), 0.7 Mpsi ($4.83 \times 10^3$ MPa), 0.8 Mpsi ($5.52 \times 10^3$ MPa), 0.9 Mpsi ($6.21 \times 10^3$ MPa), and about 1 Mpsi ($6.90 \times 10^3$ MPa).

Strain tolerance, defined as the modulus of rupture (MOR) strength divided by the elastic modulus ($E_{mod}$) can be an indicator of deformability of a porous ceramic body. In embodiments, the porous ceramic bodies exhibit a strain tolerance (MOR/$E_{mod}$) of at least about 400 parts per million, at least about 450 parts per million, at least about 500 parts per million, or even at least about 550 parts per million.

The porous cordierite ceramic honeycomb bodies comprise a plurality of cell channels extending between a first and second end as shown for example in FIG. 1. The ceramic honeycomb body may have a honeycomb structure that may be suitable for use as, for example, flow-through catalyst substrates or wall-flow exhaust gas particulate filters, such as diesel particulate filters. A typical porous ceramic honeycomb flow-through substrate article 100 according to embodiments of the disclosure is shown in FIG. 1 and includes a plurality of generally parallel cell channels 110 formed by and at least partially defined by intersecting cell walls 140 (otherwise referred to as "webs") that extend from a first end 120 to a second end 130. The channels 110 are unplugged and flow through them is straight down the channel from first end 120 to second end 130. The honeycomb article 100 also includes a skin 150 formed about the honeycomb structure, and may be formed by extrusion or in later processing as an after applied skin. In embodiments, the wall thickness of each cell wall 140 for the substrate can be, for example, between about 0.002 to about 0.010 inches (about 50 to about 250 microns). The cell density can be, for example from about 200 to about 900 cells per square inch. In some embodiments, the cellular honeycomb structure comprises a multiplicity of parallel cell channels 110 of generally square cross section formed into a honeycomb structure. Alternatively, other cross-sectional configurations may be used in the honeycomb structure as well, including rectangular, round, oblong, triangular, octagonal, hexagonal, or combinations thereof. "Honeycomb" comprises a structure of cell walls forming longitudinally-extending cells.

Figure 2:
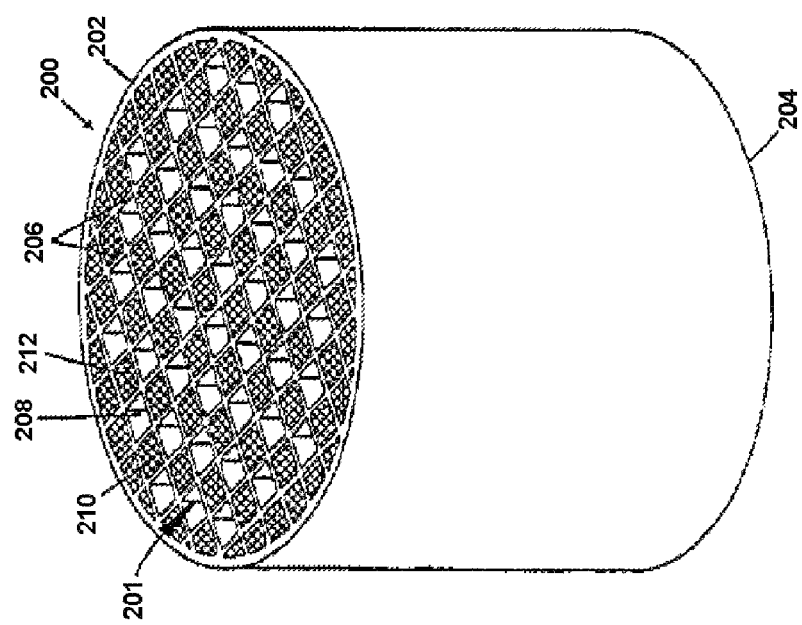
FIG. 2 is an isometric view of a porous honeycomb filter.

FIG. 2 illustrates an exemplary honeycomb wall flow filter 200 according to embodiments of the disclosure. The general structure includes a body 201 comprised of intersecting porous ceramic walls 206 extending from the first end 202 to the second end 204 and forming cells or channels. Certain cells are designated as inlet cells 208 and certain other cells are designated as outlet cells 210. In the filter 200, certain selected channels include plugs 212. Generally, the plugs are arranged at the ends of the channels and in some defined pattern, such as the checkerboard patterns shown. The inlet channels 208 may be plugged at the outlet end 204 and the outlet channels 210 may be plugged at the inlet end 202. Other plugging patterns may be employed and all of the outermost peripheral cells may be plugged (as shown) for additional strength. Alternately, some of the cells may be plugged other than at the ends. In embodiments, some channels can be flow-through channels and some can be plugged providing a so-called partial filtration design. In embodiments, the wall thickness of each cell wall for the filter can be for example from about 0.006 to about 0.030 inches (about 152 to about 762 microns). The honeycomb can comprise any desired density of cells calculated as cells per square inch. For example, in some embodiments the cell density can be between 100 and 900 cells per square inch.

In embodiments, the disclosure also provides cordierite forming precursor batch compositions and methods for making the porous cordierite ceramic bodies described above. A plasticized ceramic forming precursor batch composition is provided by compounding an inorganic batch mixture together with an organic binder; pore former, and a liquid vehicle. The plasticized batch can further comprise one or more optional constituents including plasticizers and lubricants. The plasticized batch is then formed by shaping, such as by extrusion, into a green honeycomb body. These green honeycomb bodies are then dried, such as by microwave or RF drying, and fired in a kiln for a time and at a temperature sufficient to sinter or reaction-sinter the inorganic raw material sources into unitary cordierite ceramic honeycomb bodies. As described above, the sintered ceramic bodies exhibit relatively high porosity, controlled pore size, and high strength as described above.

The inorganic batch mixture comprises a mixture of raw cordierite forming components that can be heated under conditions effective to provide a primary sintered phase cordierite composition. The raw cordierite forming batch components generally include a magnesia source; a silica source; and an alumina source. In embodiments, the inorganic batch mixture can be further selected such that from about 50 weight % to 65 weight % of the inorganic batch mixture is comprised of particulate hydrated material and wherein from about 35 weight % to about 50 weight % of the mixture is comprised of one or more particulate inorganic oxides. Still further, in embodiments it is preferred for the one or more inorganic oxides exhibit a maximum particle size ($D_{100}$) of less than about 20 microns. In still other embodiments, at least one inorganic particulate oxide and at least one particulate hydrated material each independently exhibit a maximum particle size ($D_{100}$) of less than about 20 microns.

A "magnesia source" can be any compound that contains magnesium, such as, for example, talc, calcined talc, chlorite, forsterite, enstatite, actinolite, serpentine, spinel, sapphirine, or a magnesium oxide forming source, and like materials. A magnesium oxide forming source can be any magnesia source which, upon heating, converts to magnesium compounds, such as, for example, magnesium oxide, magnesium hydroxide, magnesium carbonate, and like materials. In embodiments, the magnesium source can be a hydrated talc component. For example, the compositions can comprise from about 35% to about 45% by weight hydrated talc, from about 38% to about 42% by weight hydrated talc, or from about 39% to about 41% by weight hydrated talc, relative to the total weight of the inorganic components in the composition.

When the magnesia source comprises talc, it is preferred for the talc to have a median particle size $D_{50}$ of less than about 30 microns, or even less than about 10 microns. According to embodiments, batch compositions can comprise talc having a median particle size $D_{50}$ of from about 5 microns to about 15 microns, and a maximum particle size $D_{100}$, defined as the particle size wherein 100% of the particles have a smaller size, of from about 20 microns to about 100 microns. Particle size is measured by, for example, a laser diffraction technique, such as by a Microtrac® particle size analyzer.

In embodiments, the batch compositions can comprise clay present in a weight % amount of from about 10% by weight to about 20% by weight of the total inorganic materials. For example, clay can comprise 12% to 15% of the total weight of inorganic components. Hydrated clay, for example, can be present in a weight percent of from about 12% to about 14% of the total batch composition. Clay, when present in a batch composition, can have a median particle size $D_{50}$ of from about 2 microns to about 8 microns, for example, from about 2 microns to about 6 microns. Exemplary kaolin clays include, for example, non-delaminated kaolin raw clay, having a particle size of about 2-5 microns, and a surface area of about 10-14 m²/g, and delaminated kaolin having a particle size of about 1-3 microns, and a surface area of about 13-17 m²/g.

In embodiments, an additional alumina source, other than the clay source described above, can also be present in a batch composition. An "alumina" source can be pure alumina, such as α-alumina, or hydrated alumina, such as aluminum trihydrate or Gibbsite; a hydrated alumina can transfer to a transitional alumina such as gamma, theta, chi, or rho alumina upon heating to sufficiently high temperatures. In embodiments, the batch compositions can comprise alumina present in a weight % of from about 20% to about 30% of the total inorganic weight. An alumina forming source, if present, can have a median particle size of less than about 3 microns, and less than that 1 micron. An alumina forming source, when present, can further comprise a maximum particle size $D_{100}$ of less than about 20 microns, such as, for example, less than about 10 microns. In still further embodiments, hydrated alumina can be used in combination with another alumina source; the hydrated alumina, if present, can be a nanoparticle composition, i.e., a composition exhibiting a median particle size $d_{50}$ of from about 1 nanometer to about 100 nanometers.

If desired, the alumina source can include a dispersible alumina forming source. A dispersible alumina forming source can be, for example, an alumina forming source that can be at least substantially dispersed in a solvent or liquid medium and that can be used to provide a colloidal suspension in a solvent or liquid medium. In embodiments, a dispersible alumina forming source can be a relatively high surface area alumina forming source having, for example, a specific surface area of at least about 50 m²/g. Alternatively, a dispersible alumina forming source can have a specific surface area of at least about 100 m²/g. In embodiments, a suitable dispersible alumina forming source for use with the methods of the disclosure includes the monohydrated alumina ($Al_2O_3 \cdot H_2O$, or AlOOH) commonly referred to as boehmite, or pseudoboehmite, which is a member of the ($Al_2O_3 \cdot xH_2O$) class. In exemplary embodiments, the dispersible alumina forming source can include the so-called transition or activated aluminas (i.e., aluminum oxyhydroxide and chi, eta, rho, iota, kappa, gamma, delta, and theta alumina) which can contain various amounts of chemically bound water or hydroxyl functionalities.

According to embodiments, a "silicon source" as used herein can include a pure silica other than clay and talc described above. For example, a silica source can be quartz, cristobalite, tridymite, tripoli silica, flint, or other amorphous silica such as fused silica, and like materials, or combinations thereof. In some embodiments, the silica source can be crystalline silica such as quartz or cristobalite. In other embodiments, the silica source can be non-crystalline silica such as fused silica. Pure silica can be provided in a batch composition of from about 15% to about 20% by weight, including, for example, 16% to 19% by weight, 16% to 18% by weight, and 16% to 17% by weight. In embodiments, the silicon source can have a median particle diameter less than 5 microns, or even less than 4 microns, including, for example, median particle sizes of from about 2 microns to about 6 microns. In embodiments, the silicon source can exhibit a maximum particle size $D_{100}$ of from about 10 microns to about 80 microns, including, for example, from about 15 microns to about 25 microns, and less than about 80 microns.

In further embodiments, a silicon source can include silica forming sources. To that end, silica forming sources can be any compound that forms silica, $SiO_2$, upon heating, such as colloidal silica, sol-gel silica, silicone resin, zeolite, diatomaceous silica, and like materials, or combinations thereof. In still further embodiments, the silica forming source can include a compound that forms free silica when heated, such as for example, silicic acid or a silicon organo-metallic compound.

According to embodiments, the plasticized batch composition can also comprise a pore forming agent. The batch compositions can comprise, for example, a pore forming agent present in at least 5% by weight, for example, of from about 10% to about 30% by weight. The weight percent of the pore forming agent is calculated as a super-addition relative to the inorganic batch materials. Thus, for example, the addition of 20 parts by weight of a pore forming agent to 100 parts by weight of oxide forming raw materials shall constitute 20% addition of pore forming agent. The pore-forming agents can include, for example, graphite, flour, starch, or even combinations thereof. The starch can include, for example corn, rice, or potato starch. Starch, when present, can have a median particle size of from about 5 microns to about 20 microns, from about 5 microns to about 18 microns, or from about 6 microns to about 15 microns, with a maximum particle size $D_{100}$ of from about 30 microns to about 80 microns. The flour can include walnut shell flour. The median particle diameter of the pore forming agent in embodiments can be, for example, from about 1 to about 60 microns.

To provide a plasticized batch composition, the inorganic batch composition, including the aforementioned ceramic forming materials and a pore former, can be compounded with a liquid vehicle, an organic binder, and one or more optional forming or processing aids. Exemplary processing aids or additives can include lubricants, surfactants, plasticizers, and sintering aids. The lubricants can be solid, liquid or solution form. Exemplary lubricants can include hydrocarbon oil, tall oil, or sodium stearate.

The organic binder component can include water soluble cellulose ether binders such as methylcellulose, hydroxypropyl methylcellulose, methylcellulose derivatives, or a combination thereof. The organic binder can be present in the composition as a super-addition in an amount of from 0.1 to about 8.0 weight percent of the inorganic batch composition, and more preferably, in an amount of from about 2 to about 6 weight percent of the inorganic batch composition. The incorporation of the organic binder into the batch composition can further contribute to the cohesion and plasticity of the composition. The improved cohesion and plasticity can, for example, improve the ability to shape the mixture into a body.

One liquid vehicle for providing a flowable or paste-like consistency to the inventive compositions can be, for example, water, although other liquid vehicles exhibiting solvent action with respect to suitable temporary organic binders can be selected. The amount of the liquid vehicle component can vary in order to impart optimum handling properties and compatibility with the other components in the ceramic batch mixture. In embodiments, the liquid vehicle content can be present as a super addition in an amount of, for example, from about 3% to about 30% by weight of the inorganic batch composition, and in other embodiments from about 5% to about 20% by weight of the inorganic batch composition.

In embodiments, the plasticized batch compositions, under paste conditions, can exhibit a yield stress value of from about 120 to about 200 kilopascals, or in other embodiments from about 130 to about 180 Kilopascals, and a Young's modulus value of from about 2 to about 5 MPa, or more preferably of from about 2.2 to about 4.0 MPa. The Young's modulus, for example, can be a determinate of the stiffness of a paste derived from the batch compositions, and can, for example, determine how well a paste can accommodate a shape change from a billet shape to a honeycomb shape. The strain tolerance at peak (prior to crack) can be of from about 10% to about 20%, or in other embodiments from about 13% to about 18%.

The honeycomb substrate such as that depicted in FIG. 1 can be formed from the plasticized batch according to any conventional process suitable for forming honeycomb monolith bodies. For example, in embodiments a plasticized batch composition can be shaped into a green body by any known conventional ceramic forming process, for example, extrusion, injection molding, slip casting, centrifugal casting, pressure casting, dry pressing, and the like. In embodiments, extrusion can use a hydraulic ram extrusion press, or a two stage de-airing single auger extruder, or a twin screw mixer with a die assembly attached to the discharge end. In the latter, the proper screw elements are chosen according to material and other process conditions to build up sufficient pressure to force the batch material through the die.

The resulting honeycomb body can then be dried, and subsequently fired under conditions effective to convert the formed green composition into a primary sintered phase ceramic composition. Conditions effective for drying the formed green body functionally can include those conditions capable of removing at least substantially all of the liquid vehicle present within the green composition. As used herein, "at least substantially all" includes the removal of at least about 95%, at least about 98%, at least about 99%, or even at least about 99.9% of the liquid vehicle present prior to drying. Exemplary and non-limiting drying conditions suitable for removing the liquid vehicle include heating the green honeycomb substrate at a temperature of at least about 50° C., at least about 60° C., at least about 70° C., at least about 80° C., at least about 90° C., at least about 100° C., at least about 110° C., at least about 120° C., at least about 130° C., at least about 140° C., or even at least about 150° C. for a period of time sufficient to at least substantially remove the liquid vehicle from the green composition. In embodiments, the conditions effective to at least substantially remove the liquid vehicle comprise heating the formed green body at a temperature of at least about 60° C. Further, the heating can be provided by any conventionally known method, including for example, hot air drying, RF, microwave drying, or a combination thereof.

With reference again to FIG. 2, either before or after the green body has been fired, a portion of the cells 210 of a formed monolithic honeycomb 200 can be plugged at the inlet end 202 with a paste having the same or similar composition to that of the body 201. The plugging can be performed only at the ends of the cells and form plugs 212 having a depth of about 5 to 20 mm, although this can vary. A portion of the cells on the outlet end 204 but not corresponding to those on the inlet end 202 may also be plugged in a similar pattern. Therefore, each cell may be plugged at one end. One arrangement can therefore have every other cell on a given face plugged in a checkered pattern as shown in FIG. 2. Further, the inlet and outlet channels can be any desired shape. However, in the exemplified embodiment shown in FIG. 2, the cell channels are square in cross-sectional shape.

With reference again to FIG. 1, a ceramic article 100 formed from the cordierite forming precursor compositions, according to embodiments of the disclosure, can include a plurality of generally parallel cell channels 110 separated by and at least partially defined by porous cell channel walls 140 (i.e., "webs") that extend from a first end 120 to a second end 130. In embodiments, a plurality of parallel cell channels separated by porous cell channel walls can have a wall thickness greater than about 125 microns, greater than about 75 microns, and, for example, of from about 75 microns to about 125 microns.

The formed ceramic bodies can then be fired under conditions effective to convert the inorganic batch mixture into a primary sintered phase cordierite composition. Exemplary firing conditions can comprise heating the honeycomb green body at a maximum firing temperature of from about 1,380 to 1,440° C. for about 4 to about 40 hours to form a body with at least about 80% cordierite. The total time from room temperature until the end of the hold at maximum temperature can be at least about 20 hours.

Figure 3:
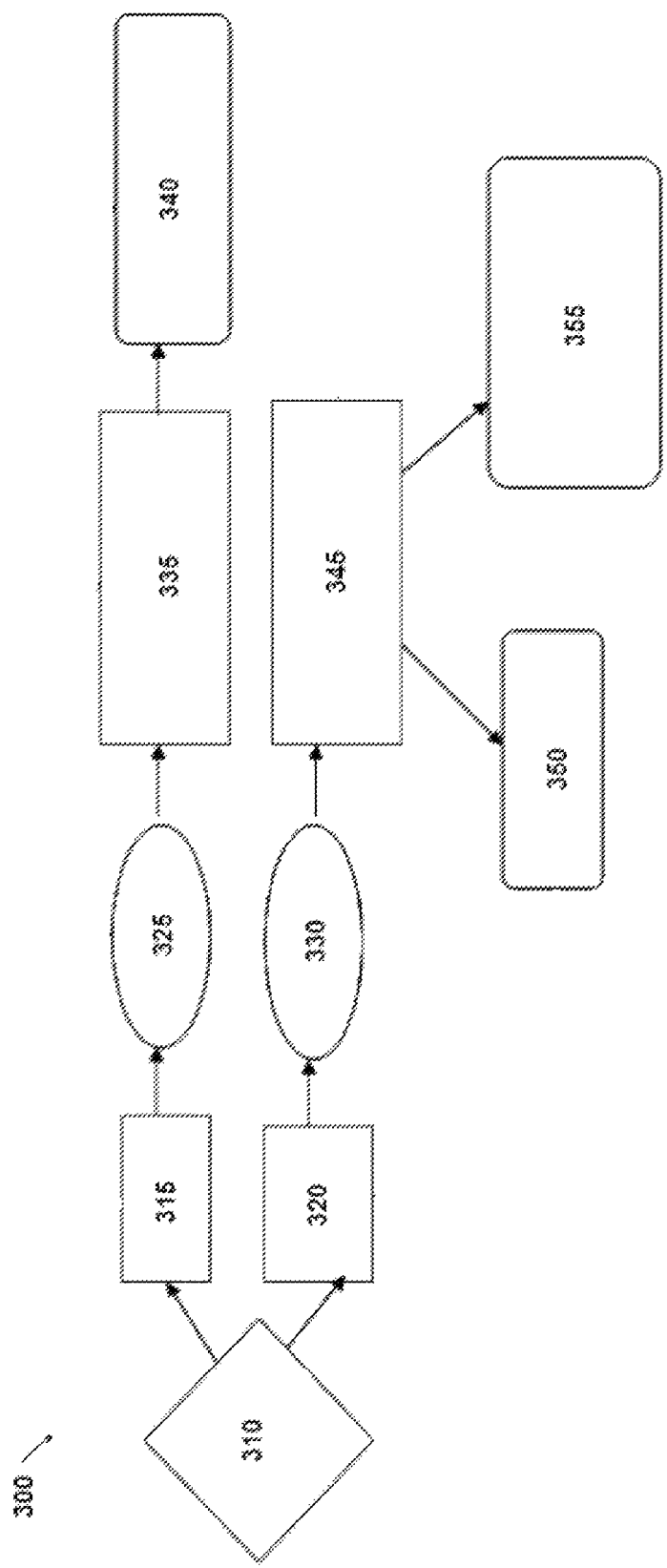
FIG. 3 is a process flow-chart for particulate diesel filter and auto substrate extrusion processes.

The cordierite forming precursor batch compositions, in embodiments, can be used to form both diesel filters and auto substrates using an extrusion process. FIG. 3 shows a process flow chart 300, where a disclosed batch composition 310 can comprise pore former 315, which after mixing 325 and twin screw extrusion 335 can yield substrates 340 with a porosity % P of for example less than about 40% for use as auto substrates. Additionally, or in the alternative, a disclosed batch composition 310 can comprise high content of pore former 320, which after mixing 330, twin screw extrusion 345, and drying and firing, can yield diesel filter 350, high porosity substrates 355, or both, with a porosity % P of for example greater than about 40%.

EXAMPLES

To further illustrate the principles of the disclosure, the following examples are provided. Unless indicated otherwise, parts are parts by weight, temperature is ° C. or at ambient temperature, and pressure is at or near atmospheric, if not otherwise specified.

Table 1 provides cordierite forming precursor batch composition parameters and parameters for articles produced therefrom. As shown in Table 1, a batch composition comprising exemplary weight % amounts of various precursor materials can be used to produce substrates or filters of different wall thicknesses, measured in mils or thousandths of an inch. By changing the particle size of inorganic precursor materials, as discussed herein, different substrates can be attained. The batches utilized the same organic package.

TABLE 1

Parameters for the production of honeycomb bodies having differing wall thicknesses from a single batch composition.

| Wall thickness (t) | t > 4 (mils) | 5 > t > 3 (mils) | t < 3 (mils) |
|---|---|---|---|
| Coarse Hydrated Talc | 41.07 (wt. %) | 41.07 (wt. %) | — |
| Fine Hydrated Talc | — | — | 41.07 (wt. %) |
| Hydrated Clay | 13.69 (wt. %) | 13.69 (wt. %) | 13.69 (wt. %) |
| AL-20 (AlOOH) | 3.09 (wt. %) | 3.09 (wt. %) | 3.09 (wt. %) |
| Coarse Alumina | 25.24 (wt. %) | — | — |
| Fine Alumina | — | 25.24 (wt. %) | 25.24 (wt. %) |
| Coarse Silica | 16.91 (wt. %) | — | — |
| Fine Silica | — | 16.91 (wt. %) | 16.91 (wt. %) |
| Pore Former | 5-20 (wt %) Corn Starch | 5-20 (wt %) Corn or Rice Starch | 5-20 (wt %) Rice Starch |

Table 2 further provides properties of cordierite bodies produced from a disclosed batch composition comprising varying amounts of corn starch pore forming agent. As shown in Table 2, differing amounts of pore forming agent can yield cordierite substrates with different total porosities, median pore sizes, and strength. In general, a linear correlation between the pore forming content and properties has been shown in the table. As pore former content increases, porosity and pore size increase linearly, and the strength decreases linearly. In this manner, the pore size and strength of porous substrates and filters can be controlled with the amount of pore former.

TABLE 2

Properties of substrates produced from batch compositions comprising varying amounts of pore forming agent.

|  | Batch | | | |
|---|---|---|---|---|
|  | Comparative | C1 | C2 | C3 |
| Starch | 0% | 0% | 10% | 20% |
| Porosity | 35.2% | 32.8% | 42.5% | 46.7% |
| MPS (μm) | 6.7 | 1.8 | 2.5 | 3.4 |
| MOR normalized[a] to 600/3.0 (psi) | 189 | 354 | 258 | 238 |
| MOR normalized[a] to 600/3.0 (Mpa) | 1.3 | 2.44 | 1.78 | 1.64 |
| CTE ($10^{-7}$) 25-800° C. | 1.9 | 1.7 | 1.8 | 0.8 |
| $E_{mod}$ ($10^6$ psi) | 0.47 | 0.79 | 0.609 | 0.471 |
| $E_{mod}$ ($10^3$ MPa) | 3.24 | 5.45 | 4.20 | 3.25 |
| Strain Tolerance (MOR/$E_{mod}$) (ppm) | 449 | 531 | 536 | 591 |

[a]The evaluated honeycombs had slight variations in cell density and due to the different web thicknesses, for convenient comparisons, the determined MOR values were normalized to a cordierite body comprising 600 cells per square inch and a web thickness of about 3 mils.

Figure 4:
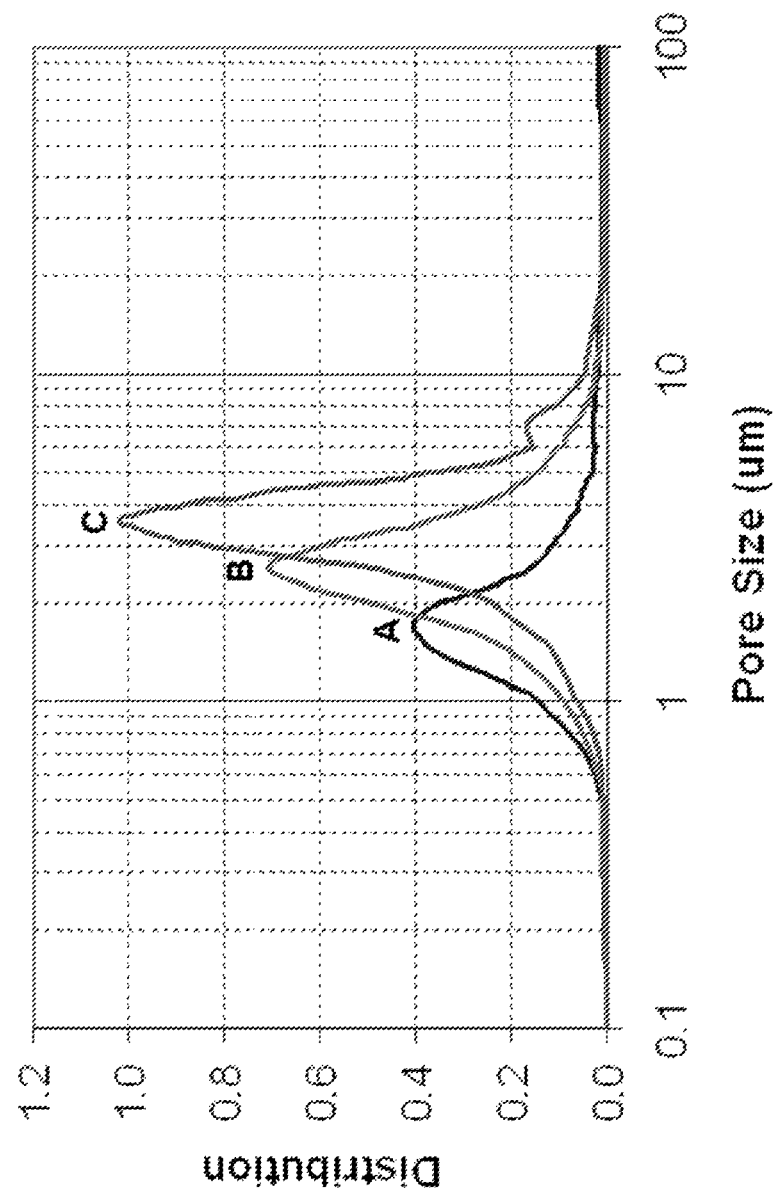
FIG. 4 is a plot of pore size distribution of batch compositions comprising pore former for thin wall products.
Figure 5:
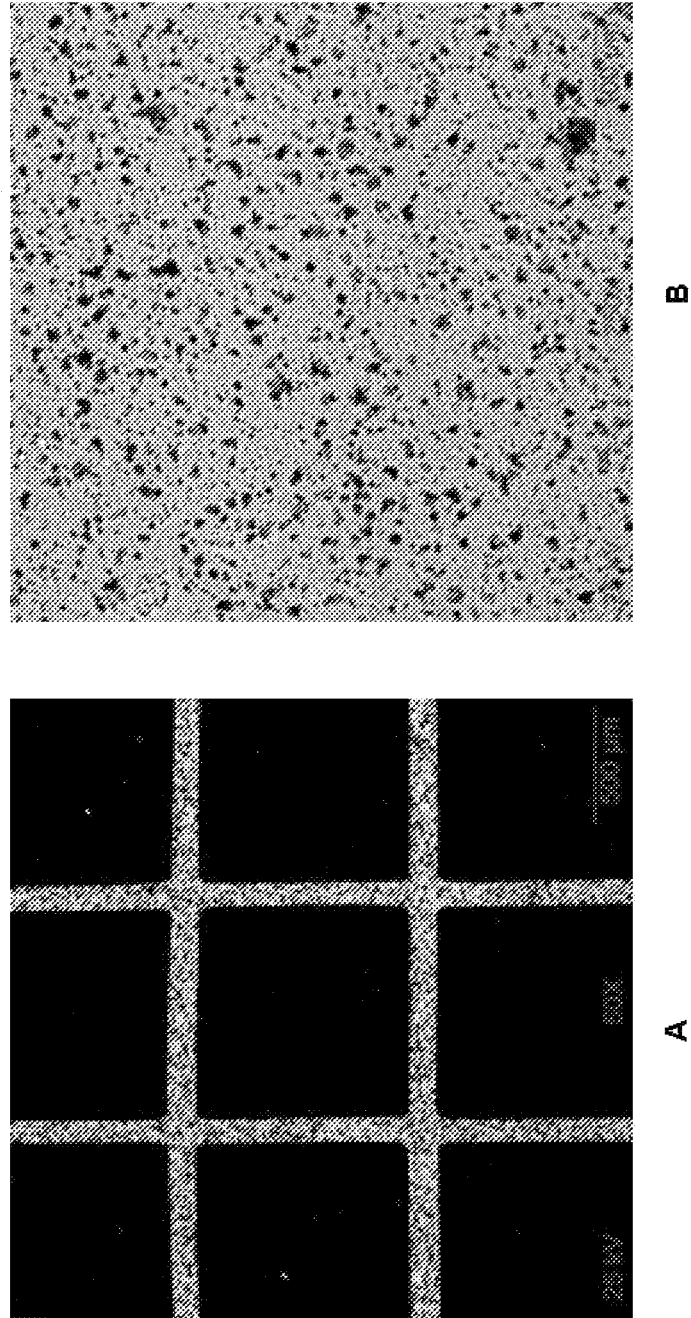
FIGS. 5A and 5B are SEM images of the interior of an exemplary batch composition with 42.5% porosity and 2.5 micron mps.

In embodiments, a cordierite ceramic body can have a relatively narrow pore size distribution. A narrow pore size distribution can be achieved, for example, through the use of a disclosed pore forming agent. With reference to FIG. 4, the pore size distribution of a ceramic body narrows as pore former content increases. Reference A in FIG. 4 indicates 0% or the absence of pore former, reference B indicates 10% pore former, and reference C indicates 20% pore former. FIG. 5A-B provides SEM images in both the interior (5A) and at the surface (5B) of a ceramic body produced from the batch composition comprising 10% corn starch, as in FIG. 4A, which has about 42.5% total porosity and about 2.5 μm median pore size $d_{50}$. Despite the high porosity of the body shown in FIG. 5, the presence of smaller pores with a narrow pore size distribution contributes to the strength of the body.

Figure 6:
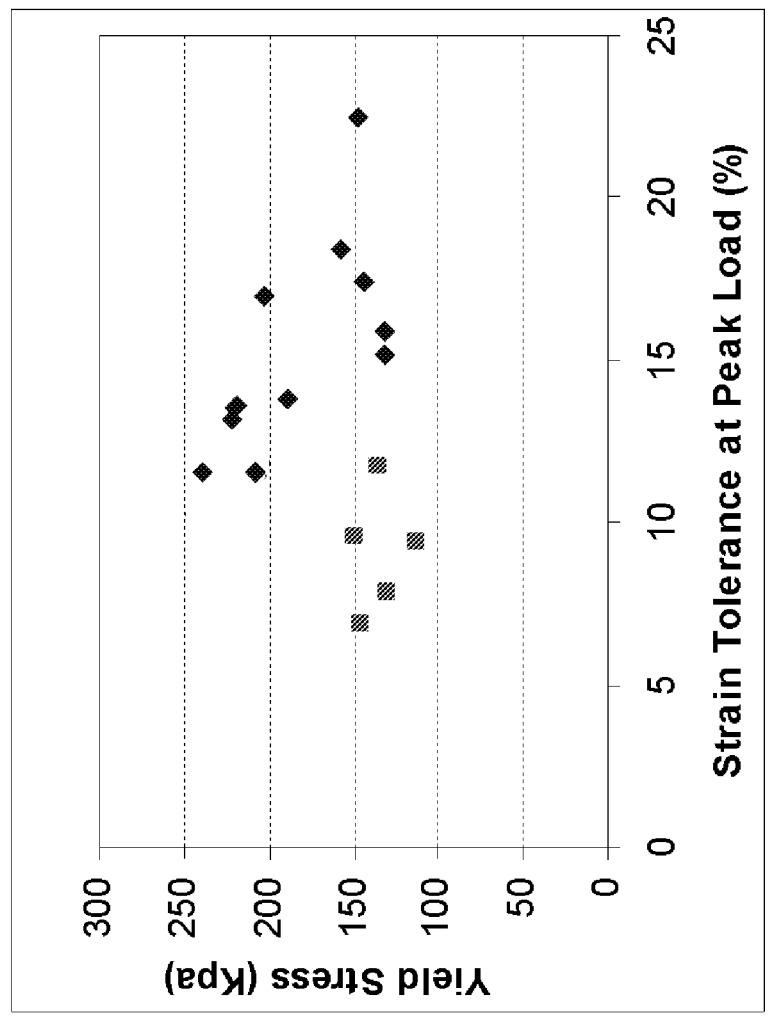
FIG. 6 is a plot of tensile behavior of presently disclosed and comparative compositions (using paste conditions).
Figure 7:
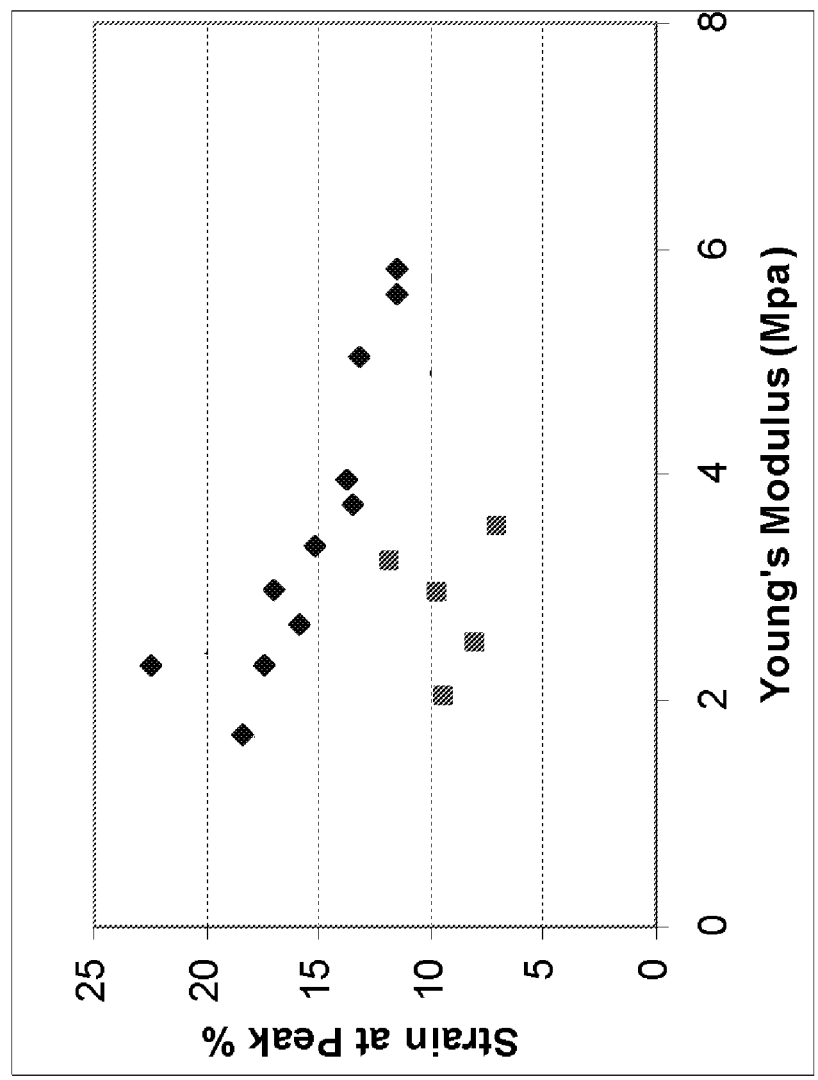
FIG. 7 is a plot of strain tolerance at peak load versus Young's modulus of disclosed cordierite pastes.

FIG. 6 provides comparative examples of the tensile behavior of presently disclosed compositions (represented by diamonds) and comparative compositions (represented by squares), under paste conditions. The presently disclosed compositions have higher strain tolerance at the same yield stress than comparative compositions. Since stress and strain are approximately inversely proportional, higher stress generally results in less strain (or less deformation). Tensile stress is also associated with extrusion pressure; higher yield stress leads to high extrusion pressure and high torque. In general, the yield stress is desired to be low enough (e.g., less than about 200 kilopascals) to avoid exceeding the upper limits of the extruder (FIG. 6). However, it will be apparent that it is also not desirable to have batch composition that is too soft. When the strain is too high (>20%) the honeycomb webs become waved. Therefore the strain tolerance at peak can in some embodiments be less than about 20% and in other embodiments be less than about 18%. The Young's modulus is also used to determine the stiffness of a batch as shown in FIG. 7 where again the presently disclosed compositions are indicated by diamonds and the comparative compositions are indicated by squares.

Table 3 provides exemplary materials and amounts thereof used in forming exemplary batch compositions suitable for making ultra-thin wall honeycomb substrates with web thicknesses of less than about 75 μm or for making honeycomb substrates for thicker web articles.

TABLE 3

Compositions for diesel filter and auto substrates.

| Material | Wt. % | $D_{50}$ (μm) | $D_{100}$ (μm) |
|---|---|---|---|
| Talc | 41.07 | 6-15 | 30-120 |
| Hydrated Clay | 13.69 | 3.5 | 30 |
| Silica | 16.91 | 2-3 | 15-25 |
| Alumina | 25.24 | 0.7 | 3.9 |
| Hydrated Alumina | 3.09 | nano particles | nano particles |
| Starch | 0-20 | 6-15 | 30-74 |
| Binder | 2.8-4.0 | | |
| Lubricant 1 | 2-4 | | |
| Lubricant 2 | 5-12 | | |

A desired stiffness range for Young's modulus is from about 2.0 to about 4.0 MPa. When Young's modulus is higher than about 4.0 MPa, such as higher than about 5.0 MPa, the paste can be too stiff to extrude. When Young's modulus is less than about 2.0 MPa or strain is higher than about 20%, the batches can be too soft to keep the web straight as shown in FIG. 8B. FIG. 8A shows the web quality of a presently disclosed substrate with an appropriate Young's modulus.

Table 4 further provides exemplary batch compositions (S1-S4) in reference to control-1, control-2, and control-3. Rheology data and extrusion conditions corresponding to the compositions provided in Table 4 are provided in Table 5. With reference to Table 5, batch compositions with a desired rheology can be extruded with good quality web and skin, while staying under the maximum pressure of an exemplary extruder which is about 4,000 pounds per square inch. For example, the S1 composition exhibits a relatively high Young's modulus, of about 5.83 MPa, which results in high torque and high extrusion pressure. However, although the S1 part quality is good, the S1 composition is still, in one aspect, not desirable since the extruder would have to run at its maximum limits. In embodiments, compositions S3 and S4 have a desired rheology for part quality and equipment capability, for example.

TABLE 4

Composition examples.

| Component | Control-1 | Control-2 | Control-3 | S1 | S2 | S3 | S4 |
|---|---|---|---|---|---|---|---|
| Starch | 0% | 5% Corn | 15% Corn | 0% | 5% Rice | 10% Rice | 20% Rice |

TABLE 4-continued

Composition examples.

| Component | Control-1 | Control-2 | Control-3 | S1 | S2 | S3 | S4 |
|---|---|---|---|---|---|---|---|
| Hydrated Talc | 40.5% | 40.5% | 40.5% | 41.5% | 41.5% | 41.5% | 41.5% |
| Hydrated Clay | 14.9% | 14.9% | 14.9% | 13.9% | 13.9% | 13.9% | 13.9% |
| Calcined Clay | 19.6% | 19.6% | 19.6% | — | — | — | — |
| Silica | 6.0% | 6.0% | 6.0% | 17.1% | 17.1% | 17.1% | 17.1% |
| Alumina | 17.0% | 17.0% | 17.0% | 25.3% | 25.3% | 25.3% | 25.3% |
| Alumina sol (nanopowder) | 2.0% | 2.0% | 2.0% | 2.2% | 2.2% | 2.2% | 2.2% |
| Binder | 2.8% | 2.8% | 2.8% | 4.0% | 3.5% | 3.5% | 3.5% |
| Oil | 5.0% | 5.0% | 5.0% | 2.0% | 3.0% | 3.0% | 3.0% |
| Other lubricant | 0.5% (S) | 0.5% (S) | 0.5% (S) | 7% (L) | 8% (L) | 12% (L) | 12% (L) |
| Water | 25.0% | 26.5% | 28.0% | — | — | — | — |

S: solid;
L: liquid

TABLE 5

Rheology data and extrusion conditions.

| Component | Control-1 | Control-2 | Control-3 | S1 | S2 | S3 | S4 |
|---|---|---|---|---|---|---|---|
| Starch | 0% | 5% Corn | 15% Corn | 0% | 5% Rice | 10% Rice | 20% Rice |
| Strip# | 2.1 | 1.8 | 2 | 2.4 | 1.8 | 1.3 | 1.5 |
| Feed rate | 35 | 35 | 35 | 23 | 31 | 35 | 35 |
| Speed | 31 | 31 | 31 | 21 | 25 | 31 | 31 |
| Torque | 45% | 43% | 61% | 76% | 72% | 68% | 70% |
| Max pressure (psi) | ~3000 | ~3000 | ~3000 | ~4000 | ~4000 | ~2950 | ~3400 |
| Strain at peak | 8.0% | 9.6% | 7.0% | 11.6% | 11.5% | 15.9% | 15.2% |
| Yield Stress (Kpa) | 131 | 150 | 147 | 240 | 208 | 132 | 132 |
| Young's modulus (Mpa) | 2.54 | 2.99 | 3.58 | 5.83 | 5.6 | 2.66 | 3.38 |
| Web quality | Broken webs | Broken webs | Good | Good | Good | Good | Good |
| Skin quality | Poor | Good | Good | Good | Good | Good | Good |

Figure 9:
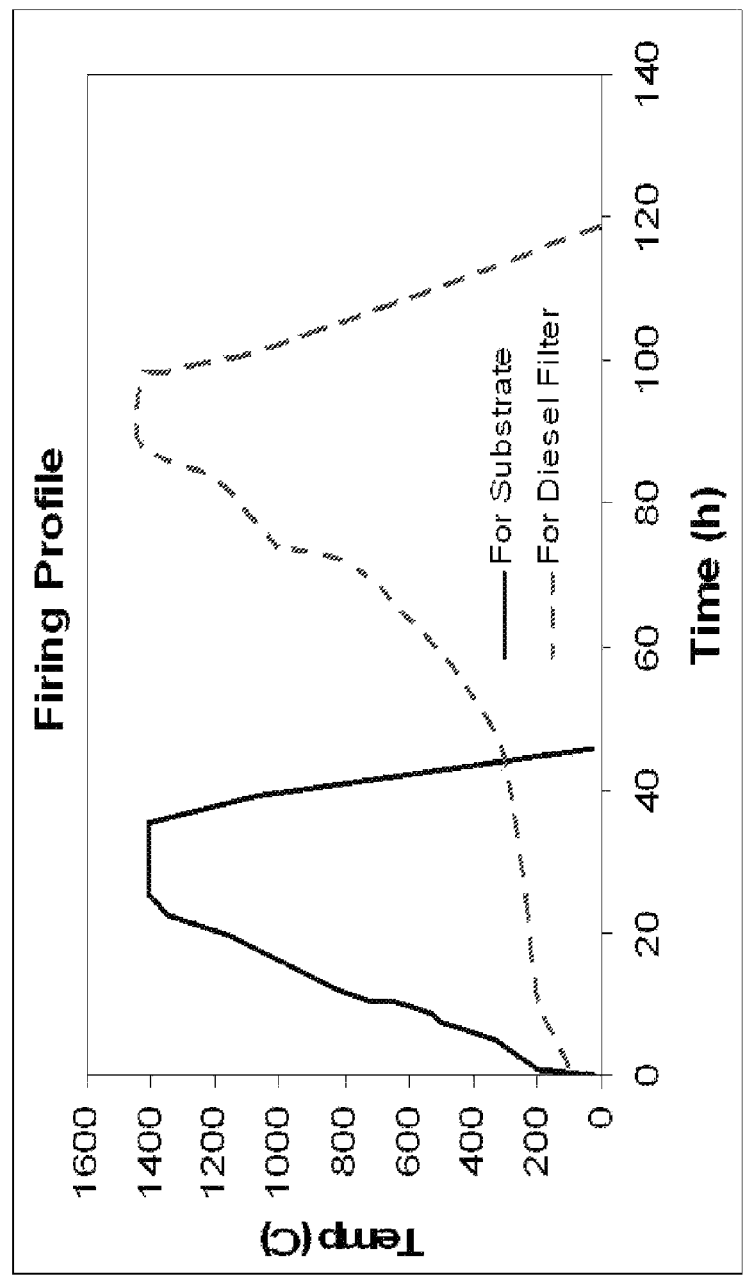
FIG. 9 is a plot of firing profiles for diesel filter and auto substrates.

After the formation of cordierite bodies, the parts can be fired by one of the profiles shown in FIG. 9. The presently disclosed compositions have broad firing windows that give similar pore structure and yield compositions that have been converted to greater than about 98% cordierite; the top temperature is from about 1400 to about 1435° C. For diesel filters, the top temperatures can be from about 1420° C. to about 1435° C. with heating rates from about 40 to about 100° C./hour prior to reaching the top temperature. For auto substrates, the top temperatures can be from about 1400° C. to about 1430° C. Both firings have a 10 hour top temperature holding time. However, the holding time can be in a range of from about 6 to about 15 hours depending on web thickness, size of parts, and like considerations.

The disclosure has been described with reference to various specific embodiments and techniques. However, many variations and modifications are possible while remaining within the spirit and scope of the disclosure.

What is claimed is:

1. A microcracked porous cordierite ceramic honeycomb body, comprising:
   a total porosity (% P) of from about 40% to about 50%, where all the pores of the honeycomb body are interconnected;
   a median pore size ($d_{50}$) in the range of from 2 microns to 10 microns;
   a cell density of 600 to 900 cells per square inch;
   a microcracked density ($Nb^3$) of greater than 0.4; and
   a modulus of rupture strength (MOR) of at least 1.52 MPa,
   wherein the honeycomb body comprises a plurality of parallel cell channels separated by porous cell channel walls having a wall thickness of from 50 to 300 microns, and the coefficient of thermal expansion (CTE) in an axial direction is less than about $3.0 \times 10^{-7}/°$ C. over from about 25° C. to about 800° C.

2. The honeycomb body of claim 1, wherein the median pore size ($d_{50}$) is from about 3 microns to about 8 microns.

3. The honeycomb body of claim 1, wherein the modulus of rupture strength is greater than about 2.07 MPa.

4. The honeycomb body of claim 1, wherein the elastic modulus ($E_{mod25° C.}$) measured at 25° C. is greater than about $2.76 \times 10^3$ MPa.

5. The honeycomb body of claim 1, comprising
   a total porosity (% P) of from about 40% to about 50%;
   a median pore size ($d_{50}$) of from about 3 microns to about 8 microns; and
   a modulus of rupture strength (MOR) greater than about 2.07 MPa.

6. The honeycomb body of claim 1, wherein the microcracking density ($Nb^3$) is from 0.45 to 0.65.

* * * * *